US006677080B2

(12) United States Patent
Tanizaki et al.

(10) Patent No.: US 6,677,080 B2
(45) Date of Patent: Jan. 13, 2004

(54) NON-AQUEOUS ELECTROLYTE SECONDARY CELL

(75) Inventors: Hiroaki Tanizaki, Miyagi (JP); Atsuo Omaru, Fukushima (JP)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 09/925,669

(22) Filed: Aug. 9, 2001

(65) Prior Publication Data

US 2002/0076612 A1 Jun. 20, 2002

(30) Foreign Application Priority Data

Aug. 14, 2000 (JP) ..................................... P2000-246023

(51) Int. Cl.$^7$ ............................................... H01M 4/32
(52) U.S. Cl. .................... 429/223; 429/224; 429/231.8; 429/231.9; 429/231.95
(58) Field of Search .......................... 429/231.9, 231.95, 429/231.8, 223, 224

(56) References Cited

U.S. PATENT DOCUMENTS

| 5,429,890 | A | * | 7/1995 | Pynenburg et al. | ......... | 429/310 |
| 5,783,333 | A | * | 7/1998 | Mayer | ......................... | 429/223 |
| 6,096,454 | A | * | 8/2000 | Tran et al. | ................. | 429/231.8 |
| 6,159,636 | A | * | 12/2000 | Wang et al. | .................. | 429/223 |
| 6,322,929 | B1 | * | 11/2001 | Takada et al. | ............... | 429/314 |
| 6,379,842 | B1 | * | 4/2002 | Mayer | ......................... | 429/231.3 |
| 6,444,370 | B2 | * | 9/2002 | Barker et al. | ................ | 429/332 |
| 6,458,487 | B1 | * | 10/2002 | Takeuchi et al. | ............. | 429/224 |
| 6,544,682 | B1 | * | 4/2003 | Takami et al. | ................. | 429/62 |

* cited by examiner

Primary Examiner—Bruce F. Bell
(74) Attorney, Agent, or Firm—Sonnenschein, Nath & Rosenthal LLP

(57) ABSTRACT

The present invention provides a non-aqueous electrolyte secondary cell including: a lithium-nickel composite oxide as a cathode active material and a material having a specific surface in the range from 0.05 m$^2$/g to 2 m$^2$/g as an anode active material. When A is assumed to be the weight of the lithium-nickel composite oxide and B is assumed to be the weight of the cathode active material other than the lithium-nickel composite oxide, the mixture ratio R expressed A/(A+B) is in the range from 0.2 to 1. This combination of the cathode active material and the anode active material enables to obtain an improved anti-over discharge characteristic even when an anode current collector contains Cu.

15 Claims, 2 Drawing Sheets

NON-AQUEOUS ELECTROLYTE SECONDARY CELL

RELATED APPLICATION DATA

The present application claims priority to Japanese Application No. P2000-246023 filed Aug. 14, 2000, which application is incorporated herein by reference to the extent permitted by law.

BACKGROUND OF THE INVENTION

1. Field of the Invention

The present invention relates to a non-aqueous electrolyte secondary cell capable of repeated charge/discharge.

2. Description of the Related Art

Recently, with development of various portable electronic apparatuses such as a video camera with video tape recorder, cellular phones, and portable personal computers, as a power source to drive these electronic, demand for secondary cells capable of repeated charge/discharge is increased instead of primary cells.

As such secondary cells, nickel-cadmium cells and nickel-metal-hydride cells are known, and special attention is paid on a so-called lithium-ion secondary cell, i.e., a non-aqueous electrolyte secondary cell using a cathode active material containing a lithium compound and an anode active material capable of doping/dedoping lithium.

This lithium-ion secondary cell has a high weight energy density and a high volume energy density and can play a great role for reducing the size and weight of portable electronic apparatuses.

Normally, the lithium-ion secondary cell includes an anode current collector containing Cu. In this lithium-ion secondary cell, when the cathode active material is a lithium-containing composite oxide such as a lithium-nickel composite oxide and a lithium-manganese composite oxide, the cathode potential prior to charge is approximately 3V against the lithium potential.

In the cell, lithium ions move from the cathode to the anode during charge and from the anode to the cathode during discharge. Because the cathode charge/discharge efficiency is 99% or above, if all of the lithium ions which have moved from the cathode to the anode during charge return to the cathode during discharge, the cathode potential against the lithium potential is approximately 3V. Accordingly, even if the cell voltage becomes 0V, theoretically the anode potential will not reach the dissolution potential of Cu contained in the anode current collector (3.45V against the lithium potential).

However, actually when lithium is doped in the anode active material, a film called Solid Electrolyte Interface (hereinafter, referred to as SEI) on the anode active material surface. If the SEI is formed on the anode active material surface, lithium capable of charge/discharge is consumed, decreasing the lithium ions returning to the cathode.

Accordingly, the cathode potential will not become less noble than the dissolution potential of Cu and the anode potential may reach the dissolution potential of Cu. Especially when the cell voltage is in an over discharge state such as 0.5 or below, Cu is dissolved out from the anode current collector. The Cu dissolved is deposited onto the anode during charge, significantly lowering the discharge amount.

For this, by providing an over discharge preventing circuit to prevent lowering the discharge amount. However, the present of the over discharge preventing circuit prevents disturbs to reduce the size and weight of portable electronic apparatuses. Accordingly, the lithium-ion secondary cell itself should have anti-over discharge characteristic.

SUMMARY OF THE INVENTION

It is therefore an object of the present invention to provide a non-aqueous electrolyte secondary cell preventing dissolution of Cu contained in an anode current collector, and having an excellent anti-over discharge characteristic and a high energy density.

The present invention provides a non-aqueous electrolyte secondary cell including: a cathode containing a lithium compound as a cathode active material; an anode having an anode current collector containing Cu, and a material capable of doping/dedoping lithium as an anode active material; and a non-aqueous electrolyte; the cathode active material containing a lithium-nickel composite oxide with a mixture ratio A/(A+B) in the range from 0.2 to 1 wherein A is assumed to be the weight of the lithium-nickel composite oxide and B is assumed to be the total weight of the cathode active material other than the lithium-nickel composite oxide, and the anode active material having a specific surface in the range from 0.05 $m^2/g$ to 2 $m^2/g$.

By using the cathode active material containing the lithium-nickel composite oxide with the mixture ratio A/(A+B) in the range from 0.2 to 1, a cathode potential lowering speed is made faster during discharge, and a cathode potential is always less noble than a dissolution potential of Cu contained in an anode current collector, and then by using the anode active material having the specific surface in the range from 0.05 $m^2/g$ to 2 $m^2/g$, it is possible to sufficiently suppress formation of SEI. Furthermore, this combination of the cathode active material and the anode active material enables to prevent dissolving out of Cu contained in an anode current collector and lowering of the discharge capacity even during over discharge.

DESCRIPTION OF PREFERRED EMBODIMENTS

Hereinafter, detailed explanation is given on a non-aqueous electrolyte secondary cell according to the present invention.

The non-aqueous electrolyte secondary cell according to the present invention is a so-called lithium-ion secondary cell and includes: a cathode having a cathode active material layer containing a cathode active material on a cathode current collector; an anode having an anode active material layer containing an anode active material and formed on the anode current collector containing Cu; and an electrolyte.

The cathode contains as the cathode active material a lithium-nickel composite oxide expressed by a general formula $LiNi_{1-x}M_xO_2$ (wherein x is in the range from 0.01 to 0.5 and M represents at least one of Fe, Co, Mn, Cu, Zn, Al, Sn, B, Ga, Cr, V, Ti, Mg, Ca, and Sr).

Moreover, the cathode may contain a cathode active material other than the lithium-nickel composite oxide. For example, the cathode active material other than the lithium-nickel composite oxide may be a lithium-manganese composite oxide expressed by a general formula $Li_yMn_{2-z}M'_zO_4$ (wherein y is in the range from 0.9 to 1.2; z is in the range from 0.01 to 0.5; and M' is at least one of Fe, Co, Ni, Cu, Zn, Al, Sn, Cr, V, Ti, Mg, Ca, and Sr).

The lithium-nickel composite oxide and the lithium-manganese composite oxide can be prepared, for example, by mixing carbonates such as lithium, nickel, manganese and the like according to a predetermined composition and burning the mixture in an atmosphere containing oxygen at the temperature range from 600° C. to 1000° C. It should be noted that the starting raw material is not limited to carbonates and it is also possible to synthesize using hydroxide, oxide, nitrate, organic acid salt, and the like.

Moreover, in this cathode, if A is assumed to be the weight of the lithium-nickel composite oxide and B is assumed to be a cathode active material other than the lithium-nickel composite oxide, the mixture ratio expressed by A/(A+B) (hereinafter, referred to as mixture ratio R) is in the range from 0.2 to 1. By setting the mixture ratio R in this range from 0.2 to 1, the cathode potential lowering speed is made faster during discharge and even during over discharge, the cathode potential is always less noble than the dissolution potential of Cu contained in the anode current collector. When the mixture ratio R is below 0.2, the cathode potential lowering speed is smaller than the desired speed.

It should be noted that the cathode active material such as the lithium-nickel composite oxide and the lithium-manganese composite oxide preferably has an average particle diameter is not greater than 30 micrometers.

The anode has an anode active layer containing a material capable of doping/dedoping lithium as the anode active material formed on the anode current collector containing Cu. It should be noted that the anode current collector may be made from Cu alone or an alloy containing Cu.

The anode active material used has a specific surface in a range from 0.05 $m^2/g$ to 2 $m^2/g$. When the anode active material has a specific surface in the range from 0.05 $m^2/g$ to 2 $m^2/g$, it is possible to sufficiently suppress formation of SEI on the anode surface.

When the anode active material has a specific surface smaller than 0.05 $m^2/g$, only a small area can be used for lithium moving and accordingly, the lithium doped in the anode active material during charge cannot be sufficiently dedoped from the anode active material during discharge, therefore, charge/discharge efficiency is lowered. On the other hand, when the anode active material has a specific surface exceeding 2 $m^2/g$, it is impossible to suppress formation of the SEI on the anode surface.

The anode active material may be any material capable doping/dedoping lithium in a potential range not exceeding 2.0V against lithium potential. More specifically, it is possible to use a non-graphitizable carbon material, artificial graphite, natural graphite, pyrographite, cokes such as pitch coke, needle coke, and petroleum coke, graphite, vitreous carbon, organic polymer compound sintered body obtained by sintering and carbonizing phenol resin, furan resin, and the like at an appropriate temperature, carbon fiber, activated carbon, carbon black, and other carbon material. Moreover, it is also possible to use a metal that can be formed into an alloy with lithium as well as the alloy. More specifically, it is possible to use iron oxide, ruthenium oxide, molybdenum oxide, tungsten oxide, tin oxide, and other oxides that can dope/dedope lithium at a comparatively low potential, and their nitrides, 3B-group elements, elements Si, Sn, and the like or alloys of Si and Sn expressed by MxSi and MxSn (wherein M represents at least one element excluding Si or Sn). Among these, it is especially preferable to use Si or Si alloy.

The electrolyte may be a so-called electrolyte solution prepared by dissolving an electrolyte salt in a non-aqueous solvent or polymer gel electrolyte prepared by dissolving an electrolyte salt in a non-aqueous solvent which solution is sustained by a polymer matrix. When using the polymer gel electrolyte as the non-aqueous electrolyte, the polymer material may be polyvinylidene fluoride, polyacrylonitrile, and the like.

The non-aqueous solvent may be any of the non-aqueous solvents which have been used in this type of non-aqueous electrolyte secondary cell. For example, it is possible to use propylene carbonate, ethylene carbonate, 1,2-dimethoxyethane, 1,2-diethoxyethane, diethyl carbonate, dimethyl carbonate, methyl ethyl carbonate, γ-butyrolactone, tetrahydrofuran, 1,3-dioxolane, 4-methyl-1,3-dioxolane, diethyl ether, sulfolane, methyl sulfolane, acetonitrile, propiononitrile, and the like. It should be noted that each of these materials may be used solely or in combination with others.

In particular, the non-aqueous solvent preferably contains an unsaturated carbonate such as vinylene carbonate, ethylene ethylidene carbonate, ethylene isopropylidene carbonate, propylidene carbonate, and the like. Among these, it is most preferable to contain vinylene carbonate. It is considered that when an unsaturated carbonate is contained as the non-aqueous solvent, it is possible to obtain an effect caused by the SEI characteristic produced in the anode active material, thereby improving the anti-over discharge characteristic.

Moreover, this unsaturated carbonate is preferably contained in the electrolyte in the range from 0.05 wt % to 5 wt % and most preferably in the range from 0.5 wt % to 3 wt %. When the unsaturated carbonate is contained in the aforementioned range, the non-aqueous electrolyte secondary cell having a high initial discharge capacity and a high energy density.

The electrolyte salt is not limited to a particular material but may be any lithium salts having ion conductivity such as $LiClO_4$, $LiAsF_6$, $LiPF_6$, $LiBF_4$, $LiB(C_6H_5)_4$, LiCl, LiBr, $CH_3SO_3Li$, $CF_3SO_3Li$, $LiN(CF_3SO_2)_3$, and the like. Each of these electrolyte salts may be used solely or in combination with other salts.

As the cell structure, it is possible to form a spirally form by coiling the cathode and the anode through a separator or a layer structure by layering the cathode and the anode through a separator, but the cell structure is not limited to particular shapes but can be made as a cylindrical type, prismatic type, coin type, button type or the like.

The non-aqueous electrolyte secondary cell having the anode current collector containing Cu as has been described above includes: a cathode containing a lithium-nickel composite oxide as the cathode active material with mixture ratio R is in the range from 0.2 to 1; and the anode containing a material having a specific surface in the range from 0.05 $m^2/g$ to 2 $m^2/g$ as the anode active material. Accordingly, formation of the SEI on the anode active material surface can be sufficiently suppressed, the cathode potential lowering during discharge is sufficiently fast, and it is possible to sufficiently prevent dissolution of Cu contained in the anode current collector during over discharge. Consequently, this non-aqueous electrolyte secondary cell has an excellent anti-over discharge characteristic, preventing lowering of the discharge capacity caused by over discharge.

Moreover, this non-aqueous electrolyte secondary cell contains an unsaturated carbonate as the electrolyte and accordingly, has an excellent anti-over discharge characteristic and has a high energy density.

EXAMPLES

Hereinafter, the present invention will be detailed according to specific experiment results.

Firstly, the cathode active material was prepared by synthesizing a lithium-nickel composite oxide and a lithium-manganese composite oxide as follows.

[Synthesizing the Lithium-Nickel Composite Oxide]

Firstly, 1.0 mol of lithium hydroxide, 0.8 mol of nickel monoxide, and 0.2 mol of cobalt monoxide were mixed and sintered in an oxygen atmosphere at the temperature of 750° C. for five hours so as to obtain $LiNi_{0.8}Co_{0.2}O_2$. Next the $LiNi_{0.8}Co_{0.2}O_2$ thus obtained was pulverized into an average particle diameter of 10 micrometers. It should be noted that this average particle diameter was measured by laser diffraction method.

[Synthesizing a Lithium-Manganese Composite Oxide]

Firstly, 0.25 mol of lithium carbonate, 0.9 mol of manganese dioxide, and 0.05 mol of dichrome trioxide were mixed and sintered in the air at the temperature of 850° C. for five hours, so as to obtain $LiMn_{1.8}CrO_2O_4$. Next, the $LiMn_{1.8}CrO_2O_4$ thus obtained was pulverized into an average particle diameter of 20 micrometers. It should be noted that this average particle diameter was measured by the laser diffraction method.

Example 1

Figure 1:
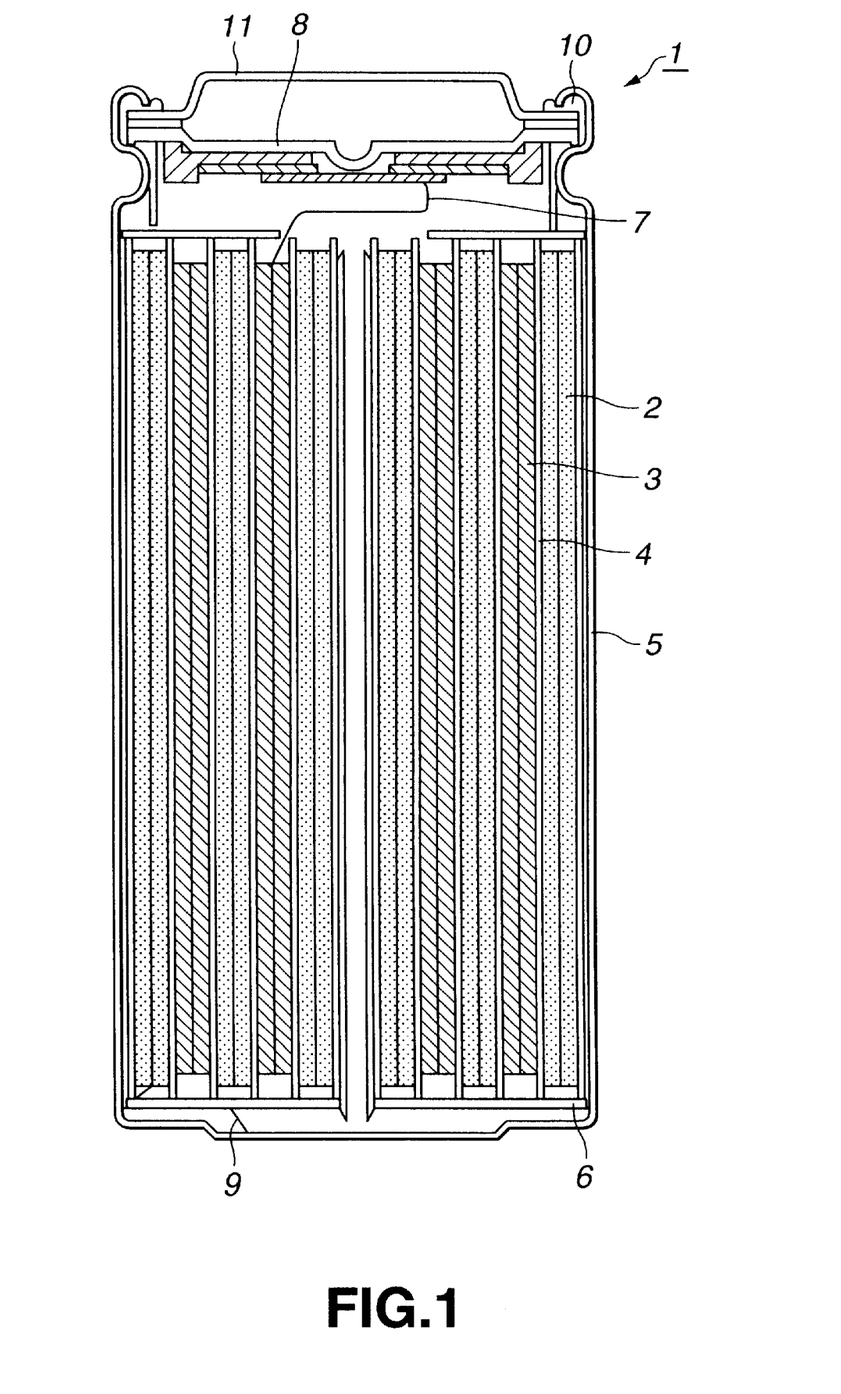
FIG. 1 is a cross-sectional view of a non-aqueous electrolyte secondary cell according to the present invention.

A cylinder-shaped non-aqueous electrolyte secondary cell 1 shown in FIG. 1 was prepared by using the cathode active material as has been described above.

[Preparation of the Anode]

Firstly, 100 weight parts of coal-based coke as a filler and 30 weight parts of coal tar-based pitch as a binder were mixed at the temperature of about 100° C. and then the mixture was compression-molded using a press to obtain a precursor of the carbon molded body. Next, this precursor was subjected to a heat treatment at the temperature not greater than 1000° C. to obtain a carbon molded body. This carbon molded body was impregnated in a binder pitch melted at the temperature not greater than 200° C. and further subjected to a heat treatment at the temperature not greater than 1000° C. The pitch impregnation/sintering step was repeated several times. Furthermore, the carbon molded body was subjected to a heat treatment in an inert atmosphere at the temperature of 2800° C., so as to obtain graphitized molded body. This graphitized molded body was pulverized into graphite sample powder.

This graphite sample powder was subjected to X-ray diffraction measurements. The interplanar spacing of (002) plane was 0.337 nm and the C-axis crystalline thickness calculated from the (002) diffraction line was 50.0 nm. Moreover, the true density measured using the pycnometer method was 2.23 $g/cm^3$. The specific surface measured by the Brunauer-Emmett-Teller method (hereinafter, referred to as BET method) was 2.0 $m^2/g$. Moreover, the particle size distribution measured by the laser diffraction method was 10 micrometers as the average particle diameter.

Next, 90 weight parts of graphite sample powder as the anode active material was mixed with 10 weight parts of polyvinylidene fluoride as a binder agent to prepare an anode composite mixture. After this, the anode composite mixture was dispersed into N-methyl pyrrolidone to obtain an anode composite mixture slurry. This anode composite mixture slurry was uniformly applied onto the both surfaces of a band-shaped copper foil having a thickness of 10 micrometers to be used as the anode current collector and dried. After this compression-molding was performed with a constant pressure to obtain a band-shaped anode 2.

[Preparation of the Cathode]

Firstly, 20 weight parts of the lithium-nickel composite oxide ($LiNi_{0.8}Co_{0.2}O_2$) thus synthesized was mixed with 80 weight parts of lithium-manganese composite oxide ($LiMn_{1.8}Cr_{0.2}O_4$) to obtain a mixture of mixing ratio R 0.2 as the cathode active material.

It should be noted that in this mixture ratio R, i.e., A/(A+B), A represents weight of the lithium-nickel composite oxide ($LiNi_{0.8}Co_{0.2}O_2$) and B represents weight of the lithium-manganese composite oxide ($LiMn_{1.8}Cr_{0.2}O_4$).

Next, 90 weight parts of this cathode active material was mixed with 7 weight parts of graphite as the conductor agent and 3 weight parts of polyvinylidene fluoride as the binder agent to obtain the cathode composite mixture. After this, the cathode composite mixture was dispersed in N-methyl pyrrolidone to obtain a cathode composite mixture slurry. This cathode composite mixture slurry was uniformly applied onto the both surfaces of a band-shaped aluminum foil having a thickness of 20 micrometers to be used as the cathode current collector and then dried. After this, compression-molding was performed with a constant pressure to obtain a band-shaped cathode 3.

[Preparation of the Non-aqueous Electrolyte Solution]

Ethylene carbonate and dimethyl carbonate were mixed with identical ratio of them to obtain a mixture solvent. Next, $LiPF_6$ was dissolved in this solvent with ratio of 1.5 mol so as to obtain a non-aqueous electrolyte solution.

The band-shaped anode 2 and the band-shaped cathode 3 prepared as has been described were layered through a separator 4 made from porous polyethylene film having a thickness of 25 micrometers. That is, the anode 2, the separator 4, the cathode 3 and the separator 4 were layered in this order and coiled multiple times to obtain a spirally-type electrode body having an outer diameter of 18 mm.

Then, the electrode body is accommodated in an iron battery can 5 to which a nickel plating is applied, and an insulating plate 6 is arranged at the bottom part of the electrode body. Further, an aluminum cathode lead 7 pulled outside from the cathode current collector is welded to a safety valve device 8, and a nickel anode lead 9 pulled outside from the anode current collector is welded to the battery can 5 through the insulating plate 6.

The non-aqueous electrolyte solution prepared as has been described above was pored into a cell can 5 and then the cell can 5 was caulked through a sealing gasket 10 painted with asphalt so as to fix a cell cover 11 to maintain air tightness in the cell.

Thus a cylindrical non-aqueous electrolyte secondary cell 1 was prepared with a diameter of 18 mm and a height of 65 mm.

Examples 2

A cylindrical non-aqueous electrolyte secondary cell was prepared in the same way as Example 1 except for using the anode active material prepared from the graphitized molded body pulverized into a graphite sample powder of an average particle diameter of 13 micrometers and a specific surface of 1.8 $m^2/g$.

Example 3

A cylindrical non-aqueous electrolyte secondary cell was prepared in the same way as Example 1 except for using the anode active material prepared from the graphitized molded body pulverized into a graphite sample powder of an average particle diameter of 20 micrometers and a specific surface of 1.4 m$^2$/g.

Example 4

A cylindrical non-aqueous electrolyte secondary cell was prepared in the same way as Example 1 except for using the anode active material prepared from the graphitized molded body pulverized into a graphite sample powder of an average particle diameter of 30 micrometers and a specific surface of 0.8 m$^2$/g.

Example 5

A cylindrical non-aqueous electrolyte secondary cell was prepared in the same way as Example 1 except for using as the anode active material a graphite sample powder prepared from the carbon molded body subjected to a heat treatment in an inert atmosphere at the temperature of 3000° C. to obtain a graphitized molded body which was pulverized into a graphite sample powder of an average particle diameter of 30 micrometers and a specific surface of 1.9 m$^2$/g.

Example 6

A cylindrical non-aqueous electrolyte secondary cell was prepared in the same way as Example 1 except for using the anode active material prepared from the graphite material pulverized into a graphite sample powder of an average particle diameter of 20 micrometers and a specific surface of 0.05 m$^2$/g.

Example 7

A cylindrical non-aqueous electrolyte secondary cell was prepared in the same way as Example 1 except for using as the cathode active material a mixture of 40 weight parts of lithium-nickel composite oxide (LiNi$_{0.8}$Co$_{0.2}$O$_2$) and 60 weight parts of lithium-manganese composite oxide (LiMn$_{1.8}$Cr$_{0.2}$O$_4$) with the mixture ratio R of 0.4.

Example 8

A cylindrical non-aqueous electrolyte secondary cell was prepared in the same way as Example 1 except for using as the cathode active material a mixture of 70 weight parts of lithium-nickel composite oxide (LiNi$_{0.8}$Co$_{0.2}$O$_2$) and 30 weight parts of lithium-manganese composite oxide (LiMn$_{1.8}$Cr$_{0.2}$O$_4$) with the mixture ratio R of 0.7.

Example 9

A cylindrical non-aqueous electrolyte secondary cell was prepared in the same way as Example 1 except for using as the cathode active material only lithium-nickel composite oxide (LiNi$_{0.8}$Co$_{0.2}$O$_2$) with the mixture ratio R of 1.

Comparative Example 1

A cylindrical non-aqueous electrolyte secondary cell was prepared in the same way as Example 1 except for using an anode active material prepared from the graphite material pulverized into a graphite sample powder of an average particle diameter of 5 micrometers and a specific surface of 2.1 m$^2$/g.

Comparative Example 2

A cylindrical non-aqueous electrolyte secondary cell was prepared in the same way as Example 1 except for using an anode active material prepared from the graphite material pulverized into a graphite sample powder of an average particle diameter of 15 micrometers and a specific surface of 3.0 m$^2$/g.

Comparative Example 3

A cylindrical non-aqueous electrolyte secondary cell was prepared in the same way as Example 1 except for using an anode active material prepared from the graphite material pulverized into a graphite sample powder of an average particle diameter of 30 micrometers and a specific surface of 0.04 m$^2$/g.

Comparative Example 4

A cylindrical non-aqueous electrolyte secondary cell was prepared in the same way as Example 1 except for using an anode active material prepared from a graphite material pulverized into a graphite sample powder of an average particle diameter of 30 micrometers and a specific surface of 0.04 m$^2$/g and a cathode active material prepared by mixing 19 weight parts of lithium-nickel composite oxide (LiN$_{0.8}$Co$_{0.2}$O$_2$) and 81 weight parts of lithium-manganese composite oxide (LiMn$_{1.8}$Cr$_{0.2}$O$_4$) with mixture ratio R of 0.19.

Comparative Example 5

A cylindrical non-aqueous electrolyte secondary cell was prepared in the same way as Example 1 except for using a cathode active material prepared by mixing 15 weight parts of lithium-nickel composite oxide (LiNi$_{0.8}$Co$_{0.2}$O$_2$) and 85 weight parts of lithium-manganese composite oxide (LiMn$_{1.8}$Cr$_{0.2}$O$_4$) with mixture ratio R of 0.15.

Comparative Example 6

A cylindrical non-aqueous electrolyte secondary cell was prepared in the same way as Example 1 except for using a cathode active material prepared from only lithium-manganese composite oxide (LiMn$_{1.8}$Cr$_{0.2}$O$_4$) with mixture ratio R of 0.

Comparative Example 7

A cylindrical non-aqueous electrolyte secondary cell was prepared in the same way as Example 1 except for using an anode active material prepared from a graphite material pulverized into a graphite sample powder of an average particle diameter of 5 micrometers and a specific surface of 2.1 m$^2$/g and a cathode active material prepared by mixing 19 weight parts of lithium-nickel composite oxide (LiNi$_{0.8}$Co$_{0.2}$O$_2$) and 81 weight parts of lithium-manganese composite oxide (LiMn$_{1.8}$Cr$_{0.2}$O$_4$) with mixture ratio R of 0.19.

The non-aqueous electrolyte secondary cells of Examples 1 to 9 and Comparative Examples 1 to 7 were subjected to an over discharge cycle test as explained below so as to evaluate the anti-over discharge characteristic. It should be noted that the over discharge cycle test was performed in two different over discharge conditions.

<Over Discharge Cycle Test (1)>

Firstly, constant-current and constant-voltage charge with a charge current of 1.0A and an upper limit of charge voltage of 4.2V was performed in a constant temperature tab of 23° C. for 3 hours. Next, a constant-current discharge was performed with a discharge current of 0.5A and a finish voltage of 3.0V. This charge and discharge were performed as one cycle, and the discharge capacity at the first cycle, i.e., the initial discharge capacity was measured.

After this, discharge was performed down to 0.5V with a constant-current of 1 mA and then over discharge (1) was performed with a constant-voltage discharge of 0.5 V for 24 hours. After this over discharge (1) the charge/discharge cycle was again performed and the discharge capacity at the 5-th cycle was measured. The ratio of the discharge capacity at the 5-th cycle against the initial discharge capacity was measured in percentage to obtain the capacity maintaining/retention ratio to evaluate the over discharge characteristic.

<Over Discharge Cycle Test (2)>

Firstly, constant-current and constant-voltage charge with a charge current of 1.0A and an upper limit of charge voltage of 4.2V was performed in a constant temperature tab of 23° C. for 3 hours. Next, a constant-current discharge was performed with a discharge current of 0.5A and a finish voltage of 3.0V. This charge and discharge were performed as one cycle, and the discharge capacity at the first cycle, i.e., the initial discharge capacity was measured.

After this, discharge was performed down to 0.01V with a constant-current of 1 mA and then over discharge (2) was performed with a constant-voltage discharge of 0.01V for 100 hours. After this over discharge (2) the charge/discharge cycle was again performed and the discharge capacity at the 5-th cycle and 10-th cycle were measured. The ratio of the discharge capacity at the 5-th cycle and at the 10-th cycle against the initial discharge capacity were measured in percentage to obtain the capacity maintaining/retention ratio to evaluate the over discharge characteristic.

It should be noted that the over discharge cycle test (1), comparatively is a gentle over discharge characteristic evaluation method and it is required to reach the capacity maintaining/retention ratio not less than 90%. Moreover, the over discharge cycle test (2), comparatively is a strict over discharge characteristic evaluation method and when the capacity maintaining/retention ratio not less than 80% is reached, it can be said that sufficient over discharge characteristic is obtained.

Table 1 shows the aforementioned measurement results: the specific surface of the anode active material together with the mixture ratio R.

TABLE 1

| | Cathode mixture ratio R | Anode active material specific surface (m²/g) | Over discharge cycle test (1) |
|---|---|---|---|
| Example 1 | 0.2 | 2.0 | 91 |
| Example 2 | 0.2 | 1.8 | 91 |
| Example 3 | 0.2 | 1.4 | 92 |
| Example 4 | 0.2 | 0.8 | 92 |
| Example 5 | 0.2 | 1.9 | 92 |
| Example 6 | 0.2 | 0.05 | 93 |
| Example 7 | 0.4 | 2.0 | 95 |
| Example 8 | 0.7 | 2.0 | 97 |
| Example 9 | 1.0 | 2.0 | 99 |
| Comparative Example 1 | 0.2 | 2.1 | 91 |
| Comparative Example 2 | 0.2 | 3.0 | 91 |
| Comparative Example 3 | 0.2 | 0.04 | 73 |
| Comparative Example 4 | 0.19 | 0.04 | 69 |
| Comparative Example 5 | 0.15 | 2.0 | 73 |
| Comparative Example 6 | 0 | 2.0 | 51 |
| Comparative Example 7 | 0.19 | 2.1 | 89 |

TABLE 1-continued

| | Capacity maintaining/retention ratio (%) | |
|---|---|---|
| | at 5-th cycle | at 10-th cycle |
| Example 1 | 81 | 70 |
| Example 2 | 85 | 75 |
| Example 3 | 91 | 81 |
| Example 4 | 92 | 86 |
| Example 5 | 91 | 74 |
| Example 6 | 91 | 76 |
| Example 7 | 95 | 71 |
| Example 8 | 96 | 75 |
| Example 9 | 98 | 82 |
| Comparative Example 1 | 78 | 6 |
| Comparative Example 2 | 30 | 5 |
| Comparative Example 3 | 20 | 3 |
| Comparative Example 4 | 15 | 2 |
| Comparative Example 5 | 42 | 15 |
| Comparative Example 6 | 25 | 5 |
| Comparative Example 7 | 74 | 5 |

Over discharge cycle test (2)

As is clear from Table 1, Examples 1 to 9 including the cathode with the mixture ratio R in the range from 0.2 to 1 and the anode containing the anode active material having the specific surface in the range from 0.05 m²/g to 2 m²/g had significantly high capacity maintaining/retention ratio after the over discharge, showing excellent anti-over discharge characteristic.

In contrast to this, Comparative Example 4 having the mixture ratio R below 0.2 and the specific surface below 0.05 m²/g and Comparative Example 7 having the mixture ratio R below 0.2 and the specific surface exceeding 2 m²/g had adverse capacity maintaining/retention ratio after the over discharge, i.e., had no anti-over discharge characteristic.

Moreover, Comparative Examples 1 and 2 having the anode containing the anode active materials with the mixture ratio R of 0.2 but the specific surface exceeding 2 m²/g had adverse capacity maintaining/retention ratio in the over discharge cycle test (2), i.e., adverse anti-over discharge characteristic. The reason is considered to be that it is impossible to sufficiently suppress formation of the SEI on the anode active material surface.

On the other hand, Comparative Example 3 including the anode containing the anode active material having the mixture ratio R of 0.2 but the specific surface below 0.05 m²/g showed remarkable lowering of the discharge capacity by the over discharge and did not show a desired anti-over discharge characteristic.

Furthermore, Comparative Examples 5 and 6 using the anode active material having the specific surface in the range from 0.05 m²/g to 2 m²/g but the mixture ratio R below 0.2 showed a remarkable lowering of the discharge capacity due to the over discharge and did not have a desired anti-over discharge characteristic. The reason is considered to be that the cathode potential lowering speed is slower than the desired speed.

Figure 2:
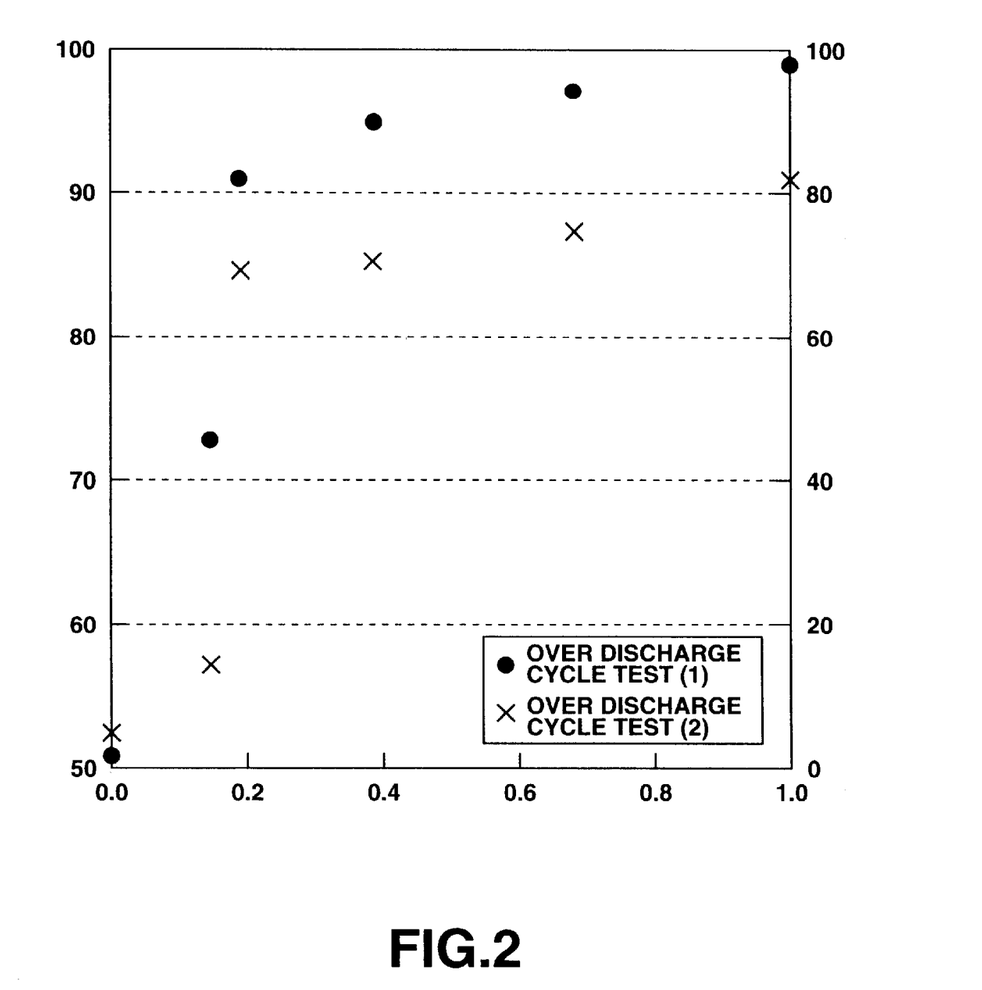
FIG. 2 shows a relationship between a capacity maintaining/retention ratio and a mixture ratio R of the non-aqueous electrolyte secondary cell.

Here, FIG. 2 shows a relationship between the mixture ratio R and the capacity maintaining/retention ratio at 5-th cycle in the over discharge cycle test (1), and the capacity maintaining/retention ratio at the 10-th cycle in the over discharge cycle test (2) for the Examples 1, 7 to 9 and Comparative Examples 5 and 6. It should be noted that in FIG. 2, a left vertical axis shows the capacity maintaining/retention ratio (%) at the 5-th cycle in the over discharge cycle test (1) and a right vertical axis shows the capacity maintaining/retention ratio (%) at the 10-th cycle in the over discharge cycle test (2). Moreover, a horizontal axis represents the mixture ratio R of the cathode active material.

As is clear from FIG. 2, Comparative Examples 5 and 6 including the anode containing the anode active material having the specific surface of 2 m² /g but the mixture ratio R below 0.2 showed a remarkable lowering of the discharge capacity due to over discharge.

The aforementioned shows that the excellent anti-over discharge characteristic can be obtained by using the cathode having the mixture ratio R in the range from 0.2 to 1 in combination with the anode containing the material having the specific surface in the range from 0.05 m²/g to 2 m²/g as the anode active material.

Next, in order to evaluate the cell characteristic when various unsaturated carbonates are added to the electrolyte, non-aqueous electrolyte secondary cells were prepared containing different amounts of the unsaturated carbonate.

Example 10

A cylindrical non-aqueous electrolyte secondary cell was prepared in the same way as Example 1 except for that 0.03 wt % of vinylene carbonate was added to the non-aqueous electrolyte solution.

Example 11

A cylindrical non-aqueous electrolyte secondary cell was prepared in the same way as Example 1 except for that 0.05 wt % of vinylene carbonate was added to the non-aqueous electrolyte solution.

Example 12

A cylindrical non-aqueous electrolyte secondary cell was prepared in the same way as Example 1 except for that 0.5 wt % of vinylene carbonate was added to the non-aqueous electrolyte solution.

Example 13

A cylindrical non-aqueous electrolyte secondary cell was prepared in the same way as Example 1 except for that 3.0 wt % of vinylene carbonate was added to the non-aqueous electrolyte solution.

Example 14

A cylindrical non-aqueous electrolyte secondary cell was prepared by the same way as Example 1 except for that 5.0 wt % of vinylene carbonate was added to the non-aqueous electrolyte solution.

Example 15

A cylindrical non-aqueous electrolyte secondary cell was prepared in the same way as Example 1 except for that 6.0 wt % of vinylene carbonate was added to the non-aqueous electrolyte solution.

Example 16

A cylindrical non-aqueous electrolyte secondary cell was prepared in the same way as Example 1 except for that 3.0 wt % of propylidene carbonate was added to the non-aqueous electrolyte solution.

Comparative Example 8

A cylindrical non-aqueous electrolyte secondary cell was prepared in the same way as Comparative Example 5 except for that 3.0 wt % of vinylene carbonate was added to the non-aqueous electrolyte solution.

Comparative Example 9

A cylindrical non-aqueous electrolyte secondary cell was prepared in the same way as Comparative Example 3 except for that 3.0 wt % of vinylene carbonate was added to the non-aqueous electrolyte solution.

Comparative Example 10

A cylindrical non-aqueous electrolyte secondary cell was prepared in the same way as Comparative Example 4 except for that 3.0 wt % of vinylene carbonate was added to the non-aqueous electrolyte solution.

Comparative Example 11

A cylindrical non-aqueous electrolyte secondary cell was prepared in the same way as Comparative Example 1 except for that 3.0 wt % of vinylene carbonate was added to the non-aqueous electrolyte solution.

The non-aqueous electrolyte secondary cells of Examples 10 to 16 and Comparative Examples 8 to 11 thus prepared were measured in the capacity maintaining/retention ratio by the aforementioned measurement method so as to evaluate the over discharge cycle characteristic after the over discharge cycle tests (1) and (2). Table 2 shows the measurement results with the specific surface of the anode active material, the mixture ratio R, and the amount of the unsaturated carbonate added.

TABLE 2

|  | Cathode mixture ratio R | Anode active material specific surface (m²/g) |
|---|---|---|
| Example 10 | 0.2 | 2.0 |
| Example 11 | 0.2 | 2.0 |
| Example 12 | 0.2 | 2.0 |
| Example 13 | 0.2 | 2.0 |
| Example 14 | 0.2 | 2.0 |
| Example 15 | 0.2 | 2.0 |
| Example 16 | 0.2 | 2.0 |
| Comparative Example 8 | 0.15 | 2.0 |
| Comparative Example 9 | 0.2 | 0.04 |
| Comparative Example 10 | 0.19 | 0.04 |
| Comparative Example 11 | 0.2 | 2.1 |

|  | Unsaturated carbonate | |
|---|---|---|
|  | Compound name | Amount added (wt %) |
| Example 10 | Vinylene carbonate | 0.01 |
| Example 11 | Vinylene carbonate | 0.05 |
| Example 12 | Vinylene carbonate | 0.5 |
| Example 13 | Vinylene carbonate | 3.0 |
| Example 14 | Vinylene carbonate | 5.0 |
| Example 15 | Vinylene carbonate | 6.0 |
| Example 16 | Propylidene carbonate | 3.0 |
| Comparative Example 8 | Vinylene carbonate | 3.0 |
| Comparative Example 9 | Vinylene carbonate | 3.0 |
| Comparative Example 10 | Vinylene carbonate | 3.0 |
| Comparative Example 11 | Vinylene carbonate | 3.0 |

Over discharge cycle test (2)

TABLE 2-continued

| | Over discharge cycle test (1) | Capacity maintaining/retention ratio (%) | |
|---|---|---|---|
| | | at 5-th cycle | at 10-th cycle |
| Example 10 | 91 | 88 | 71 |
| Example 11 | 97 | 95 | 82 |
| Example 12 | 98 | 99 | 94 |
| Example 13 | 98 | 99 | 98 |
| Example 14 | 99 | 99 | 98 |
| Example 15 | 97 | 99 | 98 |
| Example 16 | 90 | 97 | 94 |
| Comparative Example 8 | 91 | 23 | 15 |
| Comparative Example 9 | 73 | 20 | 3 |
| Comparative Example 10 | 69 | 15 | 2 |
| Comparative Example 11 | 91 | 78 | 10 |

Moreover, in Example 1 and Examples 10 to 16, the initial capacity was also measured. Table 3 shows the measurement results.

TABLE 3

| | Initial capacity (mAh) |
|---|---|
| Example 1 | 1605 |
| Example 10 | 1637 |
| Example 11 | 1644 |
| Example 12 | 1652 |
| Example 13 | 1651 |
| Example 14 | 1642 |
| Example 15 | 1592 |
| Example 16 | 1611 |

As is clear from Table 2 and Table 3, in Examples 10 to 16 including the cathode having the mixture ratio R is in the range from 0.2 to 1, the anode containing the anode active material having the specific surface in the range from 0.05 $m^2/g$ to 2 $m^2/g$, and the electrolyte containing unsaturated carbonate, the capacity maintaining/retention ratio after the over discharge is increased as compared to Example 1 having the same mixture ratio R and the specific surface but not containing the unsaturated carbonate. Furthermore, in the Examples 10 to 16, the initial capacity is increased as compared to Example 1.

This shows that when the electrolyte contains an unsaturated carbonate, the anti-over discharge characteristic is further improved and a high energy density can be obtained.

Moreover, Example 13 containing vinylene carbonate as the unsaturated carbonate showed the initial capacity greater than Example 16 containing propylidene carbonate as the unsaturated carbonate. Accordingly, it is preferable to use the vinylene carbonate as the unsaturated carbonate.

Furthermore, As compared to Example 10 containing 0.01 wt % of the unsaturated carbonate, Example 11 containing 0.05% of the unsaturated carbonate showed a greater initial capacity. On the other hand, Example 14 containing 5 wt % of the unsaturated carbonate showed a greater initial capacity as compared to Example 15 containing 6 wt % of the unsaturated carbonate. Accordingly, by containing the unsaturated carbonate in the range from 0.05 wt % to 5 wt % in the electrolyte, the non-aqueous electrolyte secondary cell can have an excellent anti-over discharge characteristic as well as a high energy density.

In contrast to this, Comparative Examples 8 and 10 having the mixture ratio R below 2, Comparative Example 9 using the anode active material having a specific surface below 0.05 $m^2/g$, and Comparative Example 11 using the anode active material having a specific surface exceeding 2.0 $m^2/g$ did not show a desired anti-over discharge characteristic although an unsaturated carbonate is contained in the electrolyte.

As is clear from the aforementioned, the non-aqueous electrolyte secondary cell according to the present invention includes a cathode containing the lithium-nickel composite oxide as the cathode active material with the mixture ratio R in the range from 0.2 to 1 and an anode containing a material having a specific surface in the range from 0.05 $m^2/g$ to 2 $m^2/g$ as the anode active material. Accordingly, it is possible to sufficiently prevent dissolving out of Cu contained in the anode current collector during over discharge. Thus, this non-aqueous electrolyte secondary cell has an excellent anti-over discharge characteristic and a high energy density.

What is claimed is:

1. A non-aqueous electrolyte secondary cell comprising:
    a cathode containing a lithium compound as a cathode active material; and
    an anode having an anode current collector containing Cu, and a material capable of doping/dedoping lithium as an anode active material; and
    a non-aqueous electrolyte;
    the cathode active material containing a lithium-nickel composite oxide with a mixture ratio A/(A+B) in the range from 0.2 to 1 wherein A is assumed to be the weight of the lithium-nickel composite oxide and B is assumed to be the total weight of the cathode active material other than the lithium-nickel composite oxide, and
    the anode active material having a specific surface in the range from 0.05 $m^2/g$ to 2 $m^2/g$.

2. A non-aqueous electrolyte secondary cell as claimed in claim 1, wherein the cathode active material contains a lithium-nickel composite oxide and a lithium-manganese composite oxide.

3. A non-aqueous electrolyte secondary cell as claimed in claim 2, wherein the lithium-nickel composite oxide contains a compound expressed by a general formula $LiNi_{1-x}M_xO_2$ (wherein x is in the range from 0.01 to 0.5; and M represents at least one of Fe, Co, Mn, Cu, Zn, Al, Sn, B, Ga, Cr, V, Ti, Mg, Ca, and Sr).

4. A non-aqueous electrolyte secondary cell as claimed in claim 3, wherein the lithium-nickel composite oxide contains $LiNi_{0.8}Co_{0.2}O_2$.

5. A non-aqueous electrolyte secondary cell as claimed in claim 2, wherein the lithium-manganese composite oxide contains a compound expressed by a general formula $Li_yMn_{2-z}M'_zO_4$ (wherein y is in the range from 0.9 to 1.2; z is in the range from 0.01 to 0.5; and M' represents at least one of Fe, Co, Ni, Cu, Zn, Al, Sn, Cr, V, Ti, Mg, Ca, and Sr).

6. A non-aqueous electrolyte secondary cell as claimed in claim 5, wherein the lithium-manganese composite oxide contains $LiMn_{1.8}Cr_{0.2}O_4$.

7. A non-aqueous electrolyte secondary cell as claimed in claim 1, wherein the electrolyte contains an unsaturated carbonate.

8. A non-aqueous electrolyte secondary cell as claimed in claim 7, wherein the unsaturated carbonate is contained in the electrolyte in the from 0.05 wt % to 5 wt %.

9. A non-aqueous electrolyte secondary cell as claimed in claim 7, wherein the unsaturated carbonate is vinylene carbonate.

10. A non-aqueous electrolyte secondary cell as claimed in claim 1, wherein the anode active material uses at least one material selected from a carbon material, a metal capable of being alloyed with lithium, or an alloy thereof.

11. A non-aqueous electrolyte secondary cell as claimed in claim 1, wherein the anode active material is graphite.

12. A non-aqueous electrolyte secondary cell as claimed in claim 1, wherein the cathode and the anode are coiled multiple times through a separator to become a spirally type electrode body.

13. A non-aqueous electrolyte secondary cell as claimed in claim 1, wherein the electrolyte is selected from a non-aqueous electrolyte solution prepared by dissolving an electrolyte salt in a non-aqueous solvent, a solid electrolyte containing an electrolyte salt, or a polymer gel electrolyte prepared by dissolving an electrolyte salt in a non-aqueous solvent which is sustained in a polymer matrix.

14. A non-aqueous electrolyte secondary cell as claimed in claim 13, wherein the non-aqueous solvent comprises at least one material selected from propylene carbonate, ethylene carbonate, 1,2-dimethoxyethane, 1,2-diethoxyethane, diethyl carbonate, dimethyl carbonate, γ-butyrol actone, tetrahydrofuran, 1,3-dioxolane, 4-methyl-1,3-dioxolane, diethyl ether, sulfolane, methyl sulfolane, acetonitrile, and propiononitrile.

15. A non-aqueous electrolyte secondary cell as claimed in claim 13, wherein the electrolyte salt comprises at least one material selected from $LiClO_4$, $LiAsF_6$, $LiPF_6$, $LiBF_4$, $LiB(C_6H_5)_4$, LiCl, LiBr, $CH_3SO_3Li$, and $CF_3SO_3Li$.

* * * * *